(12) United States Patent
Tanabe

(10) Patent No.: US 8,676,250 B2
(45) Date of Patent: Mar. 18, 2014

(54) PORTABLE ELECTRONIC DEVICE AND CONTROL METHOD THEREFOR

(75) Inventor: Shigeki Tanabe, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 139 days.

(21) Appl. No.: 13/201,714

(22) PCT Filed: Feb. 24, 2010

(86) PCT No.: PCT/JP2010/001236
§ 371 (c)(1),
(2), (4) Date: Aug. 16, 2011

(87) PCT Pub. No.: WO2010/098087
PCT Pub. Date: Sep. 2, 2010

(65) Prior Publication Data
US 2011/0300903 A1 Dec. 8, 2011

(30) Foreign Application Priority Data
Feb. 24, 2009 (JP) ................................. 2009-040195

(51) Int. Cl.
*H04M 1/00* (2006.01)
*H04N 5/225* (2006.01)
*H04M 1/725* (2006.01)

(52) U.S. Cl.
CPC ................................. *H04M 1/72519* (2013.01)
USPC ...................... 455/550.1; 455/556.1; 455/557; 348/373

(58) Field of Classification Search
USPC .......... 455/550.1, 556.1, 557, 575.3; 348/373
See application file for complete search history.

(56) References Cited

U.S. PATENT DOCUMENTS

| 6,738,095 | B2 * | 5/2004 | Dibella et al. ................. 348/373 |
| 2001/0005454 | A1 * | 6/2001 | Nishino et al. ................. 396/287 |
| 2004/0174430 | A1 * | 9/2004 | Sawahara et al. ........... 348/14.02 |
| 2006/0209197 | A1 * | 9/2006 | Vanhatalo ...................... 348/239 |
| 2007/0004451 | A1 * | 1/2007 | Anderson .................. 455/556.1 |
| 2008/0002963 | A1 * | 1/2008 | Chuang et al. ................. 396/310 |
| 2008/0045207 | A1 * | 2/2008 | Ahn et al. ...................... 455/428 |
| 2011/0157421 | A1 * | 6/2011 | Chuang et al. ............. 348/231.2 |

FOREIGN PATENT DOCUMENTS

| JP | 2004-336536 | * 11/2004 | ............ H04N 5/225 |
| JP | 2004-336536 A | 11/2004 | |
| JP | 2006-203646 A | 8/2006 | |
| JP | 2007-233135 A | 9/2007 | |
| JP | 2008-060710 | 3/2008 | |

OTHER PUBLICATIONS

International Search Report for PCT/JP2010/001236, dated Mar. 23, 2010.
Notice of Reasons for Rejection issued to JP Application No. 2009-040195, 4 pages, mailed May 14, 2013.

* cited by examiner

*Primary Examiner* — Duc M Nguyen
(74) *Attorney, Agent, or Firm* — Hoffmann & Baron, LLP

(57) ABSTRACT

Disclosed are a portable electronic device that can change imaging instruction keys according to the position of the casing, and a control method therefor. The device is provided with an operating unit casing, an operating unit that has multiple keys, an assessment unit that assesses the position of the operating side casing, a setting unit that sets the prescribed keys in the operating part to be the imaging instruction keys that give instructions for imaging according to the position of the operating side casing assessed by the assessment unit, and a camera that performs imaging according to the imaging instructions from the imaging instruction keys that are set by the setting unit.

11 Claims, 13 Drawing Sheets

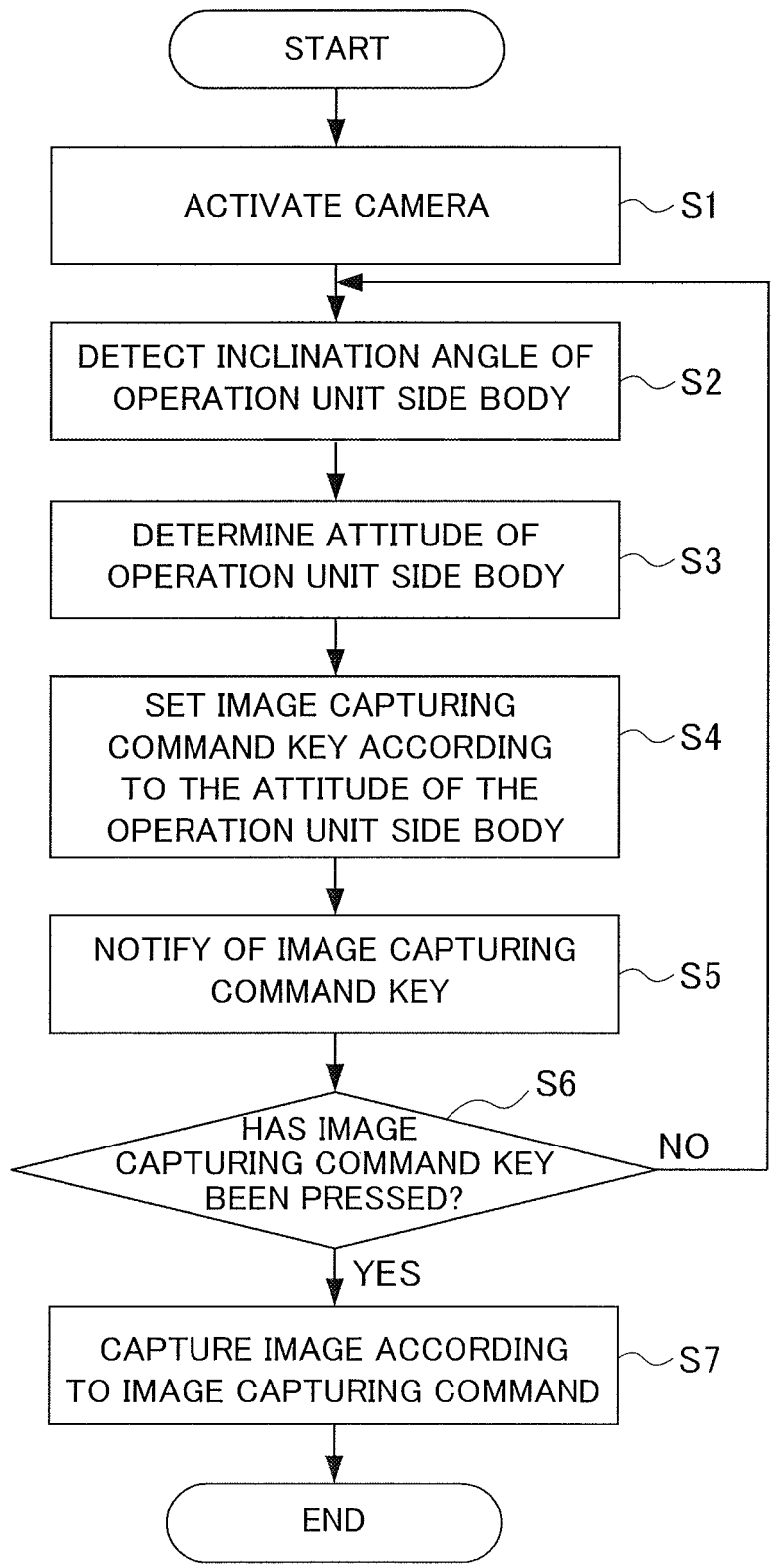

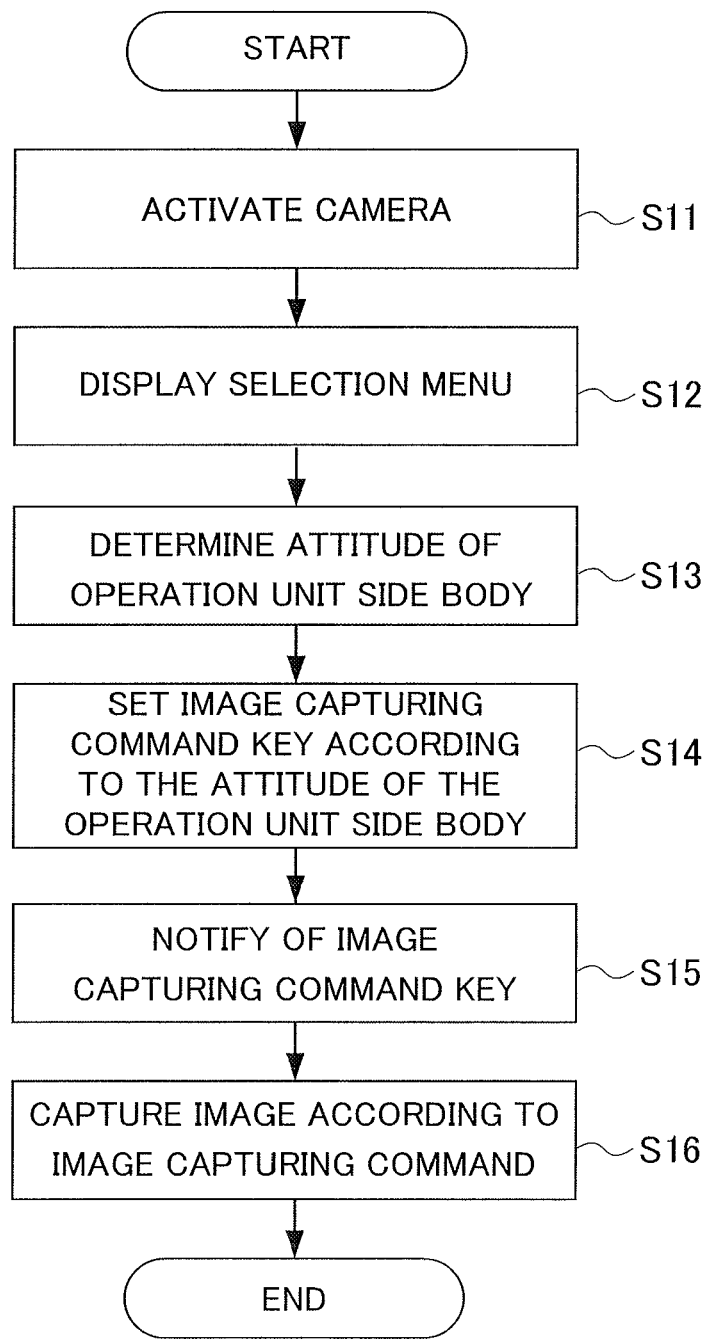

PORTABLE ELECTRONIC DEVICE AND CONTROL METHOD THEREFOR

CROSS-REFERENCE TO RELATED APPLICATIONS

This application is the National Stage of International Application No. PCT/JP2010/001236, filed Feb. 24, 2010, which claims the benefit of Japanese Application No. 2009-040195, filed Feb. 24, 2009, the entire contents of all of which are incorporated by reference herein.

FIELD OF THE INVENTION

The present invention relates to a portable electronic device having an image capturing unit and a method for controlling the same.

BACKGROUND OF THE INVENTION

Conventionally, a portable electronic device such as a cellular telephone device having an operation unit and an image capturing unit are in widespread use. A portable electronic device has been proposed that includes an operation unit having a plurality of keys and an image capturing unit that captures an image in response to an image capturing instruction for capturing by way of the operation of certain keys at the operation unit (see Japanese Unexamined Patent Application, Publication No. 2007-233135, for example).

The portable electronic device disclosed in Japanese Unexamined Patent Application, Publication No. 2007-233135 includes an image capturing unit that captures an image in response to an image capturing instruction, a blur amount detection unit for detecting an amount of blur in the image capturing unit, an operation unit having a plurality of keys, and a key setting unit that obtains the amount of blur in the image capturing unit from the blur amount detection unit each time two or more keys among the plurality of keys are operated to set a key for which the amount of blur is small as the key for the image capturing command.

[Patent Document 1] Japanese Unexamined Patent Application, Publication No. 2007-233135

SUMMARY OF THE INVENTION

Problems to be Solved by the Invention

However, when capturing an image by an image capturing unit in a cellular telephone device, it is often the case that the user has the body inclined at an angle for which it is easy to capture an image of an object to capture the image. However, it is often the case that the image capturing command key for performing an image capturing command by an image capturing unit is set to a specific key in an operation unit and cannot be changed from this specific key. Therefore, it may have been difficult to operate the image capturing command key depending on the attitude of the body (for example, inclination angle).

It is an object of the present invention to provide a portable electronic device that can change an image capturing command key depending on the attitude of a body and a method for controlling the same.

Means for Solving the Problems

The portable electronic device of the present invention includes: a body; an operation unit having a plurality of keys; a determination unit that determines an attitude of the body; a setting unit that sets predetermined keys among the plurality of keys in the operation unit as an image capturing command key for performing an image capturing command, according to the attitude of the body determined by the determination unit; and an image capturing unit that captures an image according to the image capturing command by way of the image capturing command key set by the setting unit.

Furthermore, it is preferable that the portable electronic device further comprising an inclination angle detection unit that detects an inclination angle of the body relative to a predetermined reference direction, wherein the determination unit determines the attitude of the body according to the inclination angle detected by the inclination angle detection unit.

Furthermore, it is preferable that wherein the setting unit sets a first key among the predetermined keys as the image capturing command key when the inclination angle is substantially 90 degrees clockwise when the body is seen from a face on which the operation unit is provided, and sets a second key, which is different from the first key, among the predetermined keys as the image capturing command key when the inclination angle is substantially 90 degrees anti-clockwise when the body is seen from a face on which the operation unit is provided.

Furthermore, it is preferable that wherein the plurality of keys is arranged on a face of the body in a rectangular shape with predetermined spacing, and the first key and the second key are located at corners of the face, respectively.

Furthermore, it is preferable that wherein, in the body, a key that is set as the image capturing command key is not provided on a lateral face that intersects the face.

Furthermore, it is preferable that wherein the setting unit sets a third key among the predetermined keys as the image capturing command key when the inclination angle is substantially 45 degrees clockwise when the body is seen from a face on which the operation unit is provided, and sets a fourth key, which is different from the third key, among the predetermined keys as the image capturing command key when the inclination angle is substantially 45 degrees anti-clockwise when the body is seen from a face on which the operation unit is provided.

Furthermore, it is preferable that further comprising an attitude setting unit that sets the attitude of the body in advance, wherein the determination unit determines the attitude of the body according to a setting of the attitude setting unit.

Furthermore, it is preferable that the portable electronic device further comprising a display unit that displays a selection menu for selecting a direction of the body when capturing an image by the image capturing unit, wherein the attitude setting unit sets attitude of the body according to the direction selected at the selection menu.

Furthermore, it is preferable that the portable electronic device wherein the body includes: a first body; a second body; and a connection unit that connects the first body and the second body to be openable and closable, and wherein the setting unit sets the predetermined keys as the image capturing command key in a state in which the first body and the second body are mutually opened.

Furthermore, it is preferable that the portable electronic device further comprising: a notification unit that performs notification in a predetermined mode; and a notification control unit that notifies of the image capturing command key being set by way of the notification unit in a predetermined mode, when the predetermined keys are set as the image capturing command key by the setting unit.

Furthermore, it is preferable that wherein the notification unit is a display unit, and wherein the notification control unit displays a location of the image capturing command key on the display unit in the predetermined mode.

Furthermore, it is preferable that wherein the notification unit is a back light of the plurality of keys, and wherein the notification control unit turns on a back light of the predetermined keys set as the image capturing command key or changes a color of the back light of the predetermined key set as the image capturing command key as the predetermined mode.

Furthermore, it is preferable that wherein the predetermined keys are input operation keys for inputting a character, numeral or symbol.

A method for controlling a portable electronic device of the present invention includes: a body and an operation unit having a plurality of keys, the method comprising: a determination step of determining an attitude of the body; a setting step of setting a predetermined key among the plurality of keys in the operation unit as an image capturing command key for performing an image capturing command, according to the attitude of the body determined in the determination step, and an image capturing step of capturing an image according to the image capturing command image by way of the image capturing command key set in the setting step.

Effects of the Invention

According to the present invention, it is possible to provide a portable electronic device that can change an image capturing command key depending on the attitude of a body and the method for controlling the same.

BRIEF DESCRIPTION OF THE DRAWINGS

FIG. 7 is a flowchart illustrating operations when capturing an image by a camera 231 according to the cellular telephone device 1 according to the first embodiment;

FIG. 10 is a flowchart illustrating operations when capturing an image by the camera 231 of the cellular telephone device 1 according to the second embodiment.

DETAILED DESCRIPTION OF THE INVENTION

Figure 1:
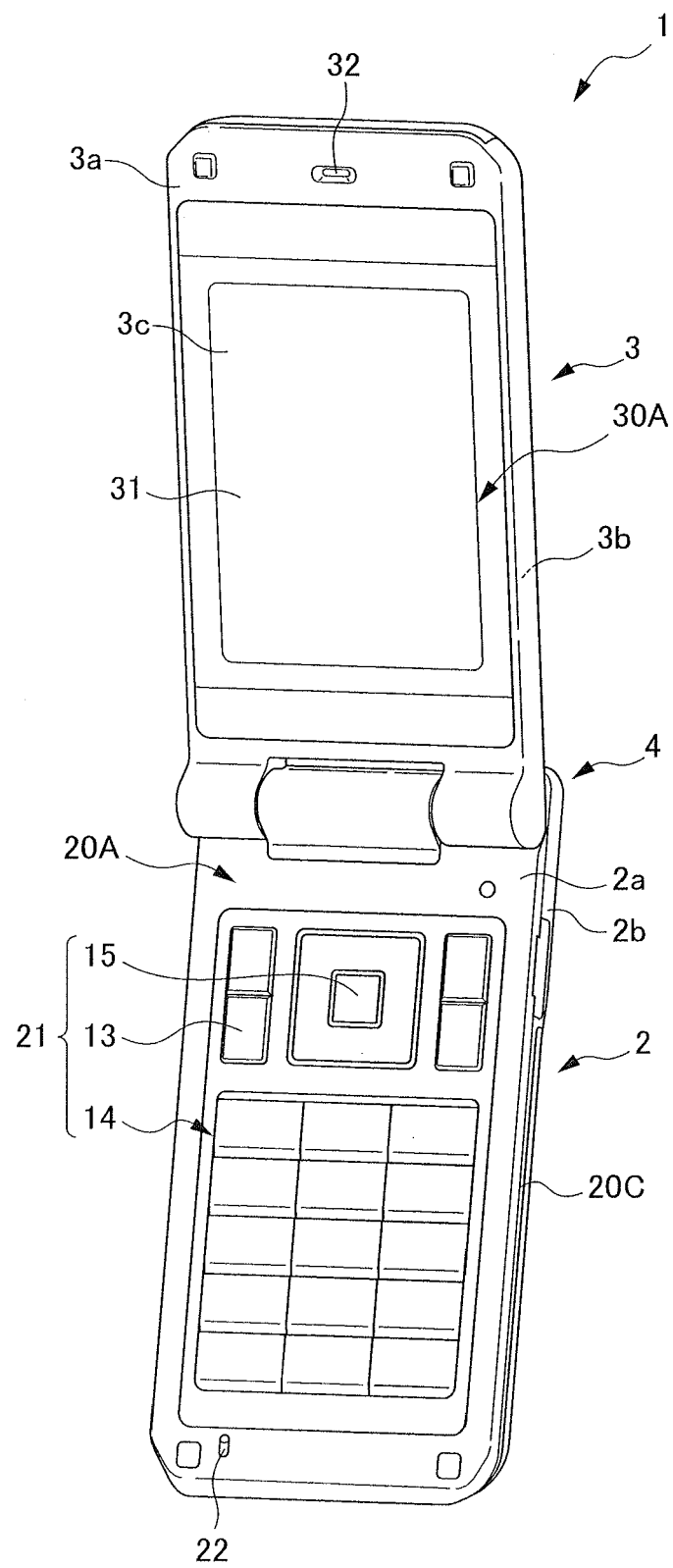
FIG. 1 is a perspective view of a cellular telephone device 1 in an opened state according to an embodiment of the present invention.
Figure 2:
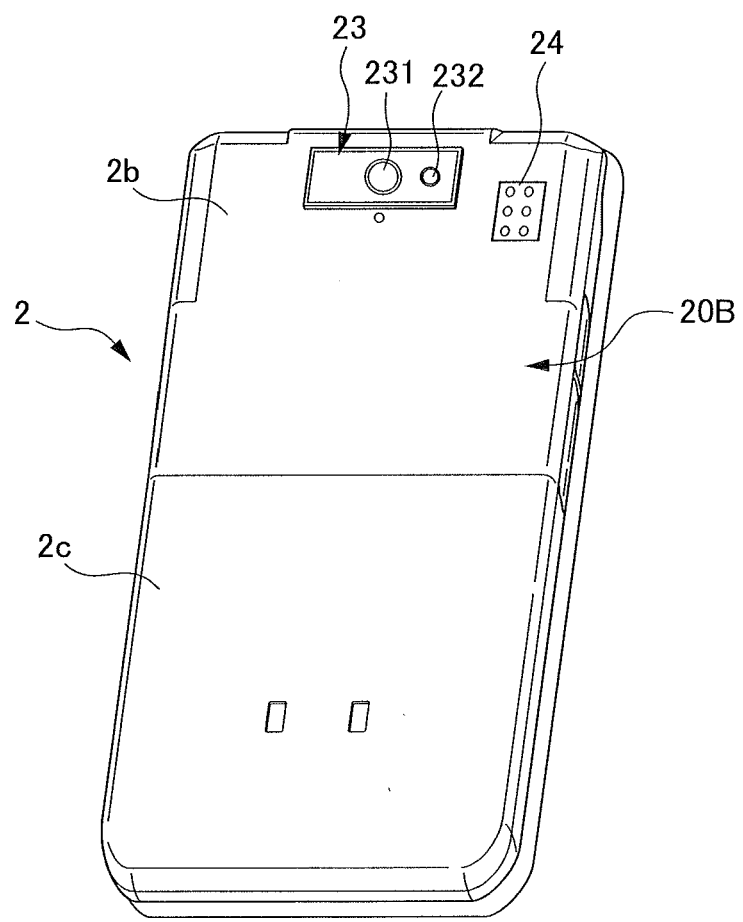
FIG. 2 is a perspective view of the cellular telephone device 1 in an closed state as seen from a back face 20B of an operation unit side body 2.

Hereafter, preferred embodiments for implementing the present invention are explained with reference to the drawings. Initially, a basic structure of a cellular telephone device 1 as an embodiment of a portable electronic device of the present invention is explained with reference to FIGS. 1 and 2. FIG. 1 is a perspective view of the cellular telephone device 1 in an opened state according to an embodiment of the present invention. FIG. 2 is a perspective view of the cellular telephone device 1 in an closed state as seen from a back face 20B of an operation unit side body 2.

The cellular telephone device 1 includes the operation unit side body (a first body) 2, a display unit side body (a second body) 3 as bodies, and a connection unit 4 that connects the operation unit side body 2 with the display unit side body 3.

As shown in FIGS. 1 and 2, the operation unit side body 2 is formed in a thin, substantially rectangular shape, and is mainly configured with a front case 2a constituting a front face 20A as one face, a rear case 2b constituting a back face 20B, and a battery cover 2c. Furthermore, inside this operation unit side body 2 is provided a circuit board (not illustrated) in which a plurality of electronic components such as a control unit 45 that controls various operations of the cellular telephone device 1, memory 44 that stores various information, and an acceleration sensor 46 (refer to FIG. 3 for all) are mounted.

As shown in FIG. 1, an operation unit 21 through which predetermined input operations are performed and a microphone 22 are provided at the front face 20A of the operation unit side body 2. The front face 20A faces the display unit body 3 when the cellular telephone device 1 is folded.

The operation unit 21 includes a plurality of keys. More specifically, the operation unit 21 includes a function setting operation key 13 for bringing various functions such as various settings, a telephone directory function, a mail function, and the like, and an input operation key 14 such as a numerical keypad for inputting numbers of a telephone number, characters of mail, and the like, for example, and a determination operation key 15 that performs determination in various operations, scrolling in up, down, left and right directions, and the like.

Furthermore, the function setting operation key 13, the input operation key 14, and the determination operation key 15 of the operation unit 21 are aligned with each other with a certain space on the front face 20A of the operation unit side body 2.

A predetermined function is assigned to each key constituting the operation unit 21 according to the opened or closed state of the operation unit side body 2 and the display unit side body 3 and type of application running (key assigning). In the cellular telephone device 1, when a user presses the respective keys constituting the operation unit 21, an operation is executed according to the function assigned to each key.

The microphone 22 is used for inputting sounds produced during a call by the user of the cellular telephone device 1.

As shown in FIG. 2, a camera unit 23 and a speaker 24 as a sound output unit are provided at the back face 20B of the operation unit side body 2. The back face 20B is located opposite the front face 20A. Furthermore, a lateral face 20C refers to a face intersecting the front face 20A and the back face 20B of the operation unit side body 2.

The camera unit 23 includes a camera 231 (an image capturing unit) and a light 232. The camera 231 is used for capturing an object to obtain image information. The light 232 irradiates light to an object to be captured by the camera 231.

The speaker 24 outputs sounds for notifying the user of an incoming call or incoming mail to the cellular telephone device 1.

As shown in FIG. 1, the display unit side body 3 is formed in a thick, substantially rectangular shape, and is mainly configured with a front case 3a and front panel 3c constituting a front face 30A, and a rear case 3b constituting a back face. A display unit 31 for displaying various information and a receiver 32 for outputting sounds of the other party of a call are provided at the front face 30A of the display unit side body 3. The front face 30A faces the operation unit side body 2 when the cellular telephone device 1 is folded.

The display unit 31 displays standby images during communications and calls, images based on an application that allows a predetermined function to operate. The receiver 32 outputs the sounds of the other part of a call. Furthermore, the display unit 31 and the receiver 32 are provided at a location hidden when the cellular telephone device 1 is in the closed state (an unexposed location).

A sub display unit (not illustrated) for displaying a variety of information is provided at a back face of the display unit side body 3. The back face is located on an opposite side to the front face 30A. That is to say, the sub display unit is provided at a location where it is exposed to the outside even if the cellular telephone device 1 is in the closed state.

Each of the display 31 and the sub display unit located at the display unit side body 3 is configured with a liquid crystal panel, a drive circuit that drives the liquid crystal panel, and a light source unit such as a back light that irradiates light from a back face side of the liquid crystal panel (none illustrated).

The connection unit 4 connects the operation unit side body 2 with the display unit side body 3 so as to move relative to each other. The connection unit 4 connects an upper end portion of the operation unit side body 2 with a lower end portion of the display unit side body 3. By relatively rotating the operation unit side body 2 and the display unit side body 3 connected via the connection unit 4, the cellular telephone device 1 can be set such that the operation unit side body 2 and the display unit side body 3 are in an opened state (an opened state) and in a folded state (a closed state) relative to each other.

Figure 3:
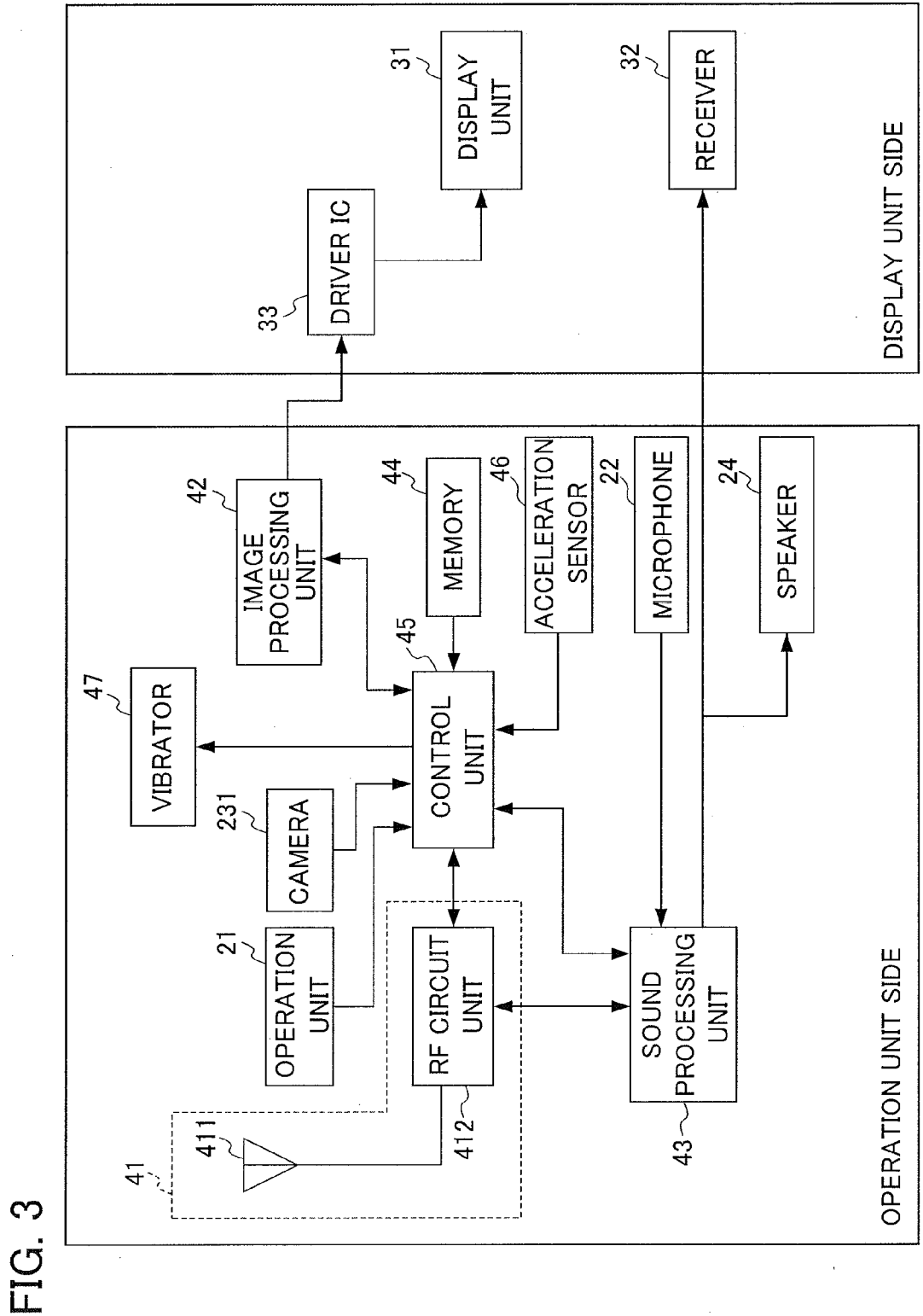
FIG. 3 is a block diagram illustrating a function of the cellular telephone device 1.

Next, functions of the cellular telephone device 1 are explained with reference to FIG. 3. FIG. 3 is a block diagram illustrating functions of cellular telephone device 1. The cellular telephone device 1 includes the operation unit 21, microphone 22, communication unit 41, image processing unit 42, sound processing unit 43, memory 44, control unit 45, acceleration sensor 46, vibrator 47, and camera 231 in the operation unit side body 2. Furthermore, the cellular telephone device 1 includes a display unit 31, receiver 32, and driver IC 33 in the display unit side body 3.

The communication unit 41 includes a main antenna 411 and an RF circuit unit 412. The communication unit 41 performs predetermined communication with a destination thereof. Examples of destinations with which the communication unit 41 performs communication include an external terminal device that performs phone calls and receiving and sending of mails from/to the cellular telephone device 1 and an external device such as a web server that allows the cellular telephone device 1 to execute internet connection.

The main antenna 411 performs communication with an external device at a predetermined usable frequency band (for example, 800 MHz). The RF circuit unit 412 demodulates signals received by the main antenna 411 and supplies the demodulated signals to the control unit 45. Furthermore, the RF circuit unit 412 modulates the signals supplied from the control unit 45 and sends them to an external device (a base station) via the main antenna 411.

The image processing unit 42 executes predetermined image processing according to the control of the control unit 45 and outputs the processed image data to the driver IC 33. The driver IC 33 stores the image data supplied from the image processing unit 42 in frame memory (not illustrated) and outputs to the display unit 31 at a predetermined timing.

The sound processing unit 43 executes predetermined sound processing on the signals supplied from the RF circuit unit 412 according to the control of the control unit 45, and outputs the processed signals to the receiver 32 and the speaker 24.

Furthermore, the sound processing unit 43 processes the signals inputted from the microphone 22, and outputs the processed signals to the RF circuit unit 412. The RF circuit unit 412 executes predetermined processing on the signals supplied from the sound processing unit 43, and outputs the processed signals to the main antenna 411.

The receiver 32 and the speaker 24 externally output the signals supplied from the sound processing unit 43 according to the control of the control unit 45.

The memory 44 includes working memory, for example, and is used for arithmetic processing by the control unit 45. Furthermore, data, tables, and the like used by various applications run on the cellular telephone device 1 are stored in the memory 44. Furthermore, the memory 44 may be detachable external memory.

The control unit 45 controls the entirety of the cellular telephone device 1 and executes predetermined control over the control unit 41, the image processing unit 42, the display unit 31, the sound processing unit 43, the speaker 24, the receiver 32, the vibrator 47, and the like. The specific configuration of the control unit 45 will be described later.

The acceleration sensor 46 detects a change in the position of the operation unit side body 2 as an acceleration value, and outputs it to the control unit 45. The control unit 45 (an inclination angle detection unit 451 described later) detects the attitude of the operation unit side body 2 based on the acceleration value outputted by the acceleration sensor 46.

The vibrator 47 is mounted inside the operation unit side body 2 and generates vibrations according to the control of the control unit 45. The vibrations generated by this vibrator 47 are transmitted to the operation unit side body 2, a result of which the cellular telephone device 1 vibrates.

First Embodiment

Figure 4:
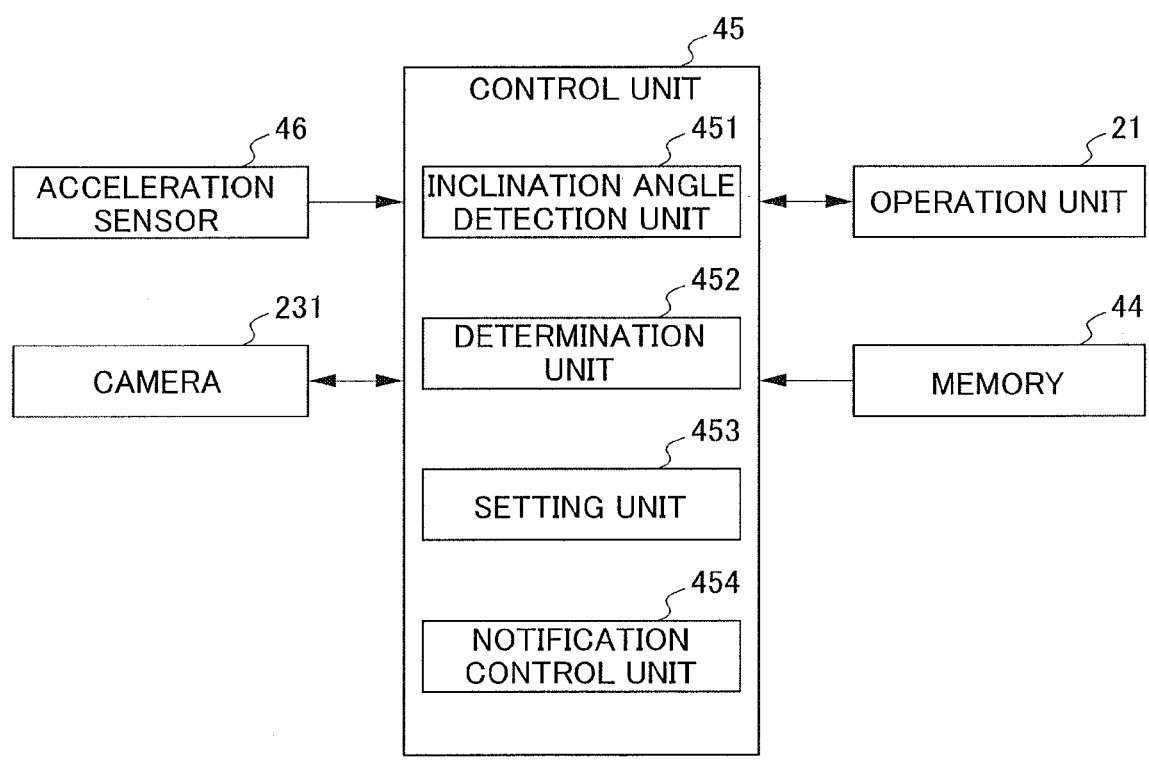
FIG. 4 is a block diagram illustrating a function of the cellular telephone device 1 according to a first embodiment.

In the following, configurations and operations for realizing functions of the cellular telephone device 1 are described in detail. Initially, configurations for realizing the functions of the cellular telephone device 1 according to a first embodiment are explained with reference to FIG. 4. FIG. 4 is a block diagram illustrating functions of the cellular telephone device 1 according to the first embodiment.

As shown in FIG. 4, the cellular telephone device 1 includes the acceleration sensor 46, camera 231, operation unit 21, memory 44, and control unit 45.

The memory 44 stores an acceleration value outputted by the acceleration sensor 46, an inclination angle of the operation unit side body 2 corresponding to the acceleration value, and the attitude of the operation unit side body 2 corresponding to the inclination angle to be associated with each other.

The control unit 45 includes an inclination angle detection unit 451, determination unit 452, setting unit 453, and notification control unit 454. The inclination angle detection unit 451 detects an inclination angle of the operation unit side body 2 with respect to a predetermined reference direction. More specifically, when an acceleration value is output by the acceleration sensor 46, the inclination angle detection unit 451 refers to the memory 44, reads an inclination angle of the operation unit side body 2 that stored to be associated with the acceleration value outputted by the acceleration sensor 46 to detect the actual inclination angle of the operation unit side body 2. It should be noted that a predetermined reference direction is described later.

The determination unit 452 determines the attitude of the operation unit side body 2. More specifically, the determination unit 452 determines the attitude of the operation unit side body 2 according to the inclination angle detected by the inclination angle detection unit 451. In detail, the determination unit 452 determines the attitude of the operation unit side body 2, which is stored to be associated with an inclination angle in the memory 44, according to the inclination angle detected by the inclination angle detection unit 451.

The setting unit 453 sets a predetermined key in the operation unit 21 as an image capturing command key to perform an image capturing command, according to the attitude of the operation unit side body 2 which is determined by the determination unit 452. Furthermore, "image capturing command key" refers to a key (a shutter key) that performs an image capturing command when performing image capturing using the camera 231.

When a predetermined key in the operation unit 21 is set as an image capturing command key by the setting unit 453, the notification control unit 454 notifies of the fact that the image capturing command key has been set, by way of a notification unit in a predetermined mode. Here, for example, the display unit 31, a back light (not illustrated) of each key at the operation unit 21 and the like functions as a notification unit. Furthermore, examples as the predetermined mode include displaying a location of the image capturing command key on the display unit 31, turning on a back light of a predetermined key set as the image capturing command key, changing a color of a back light of a predetermined key set as the image capturing command key, and the like.

The camera 231 captures an image according to an image capturing command by way of the image capturing command key set by the setting unit 453.

Figure 5A:
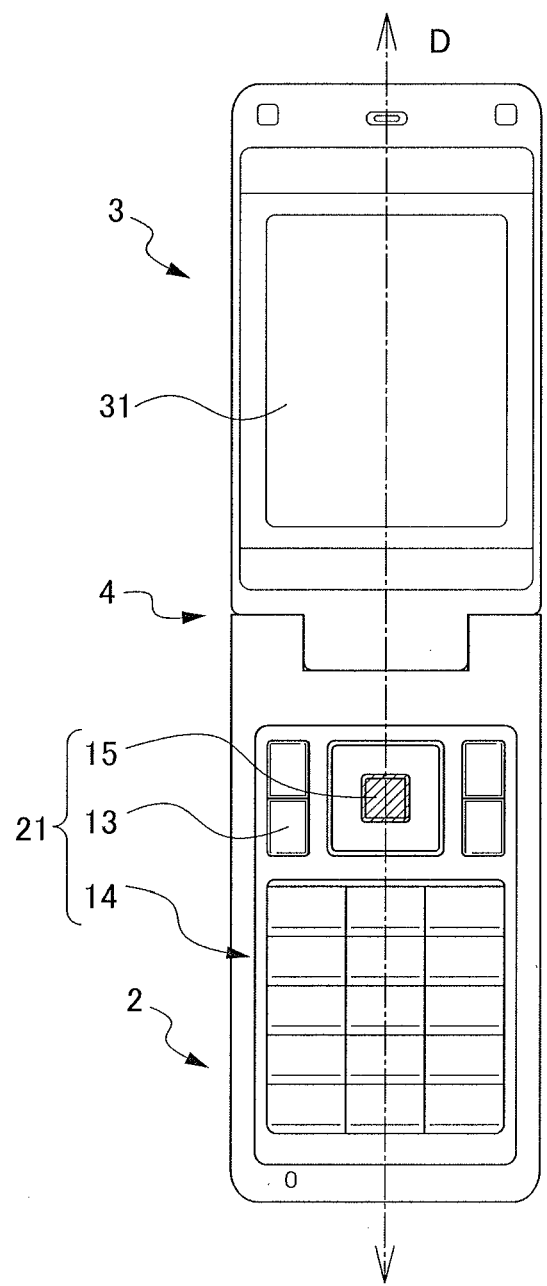
FIG. 5A is a view illustrating the attitude of an operation unit side body 2 and a set location of an image capturing command key corresponding to the attitude.
Figure 5B:
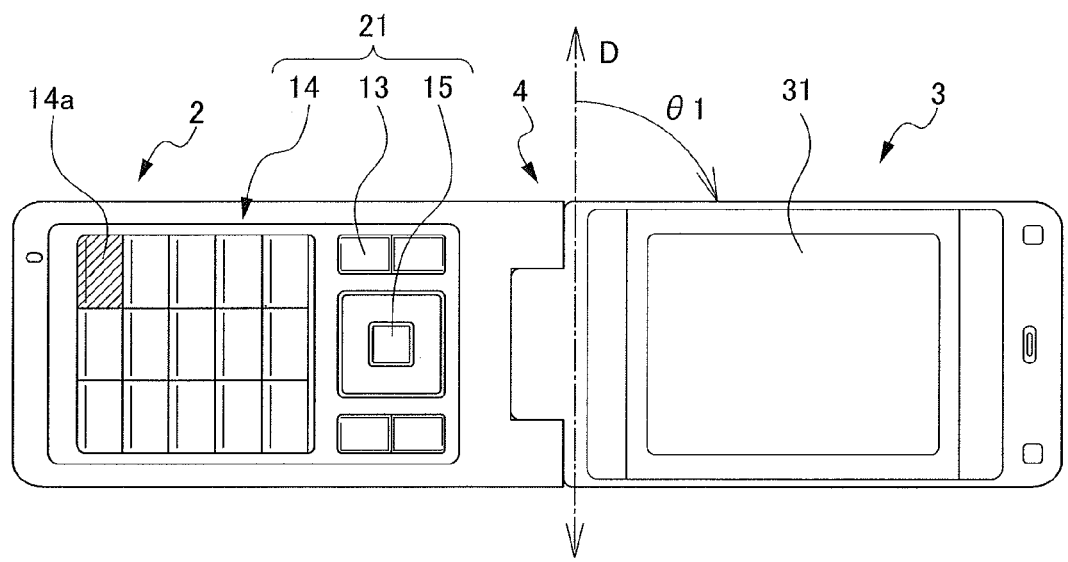
FIG. 5B is a view illustrating attitude of the operation unit side body 2 and a set location of an image capturing command key corresponding to the attitude.
Figure 5C:
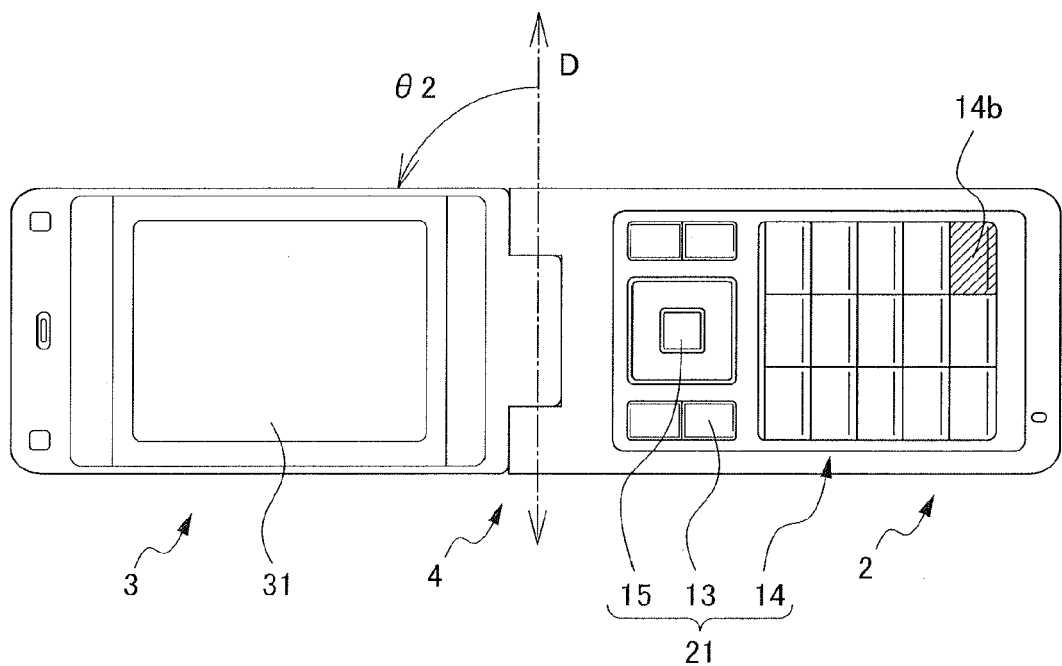
FIG. 5C is a view illustrating the attitude of the operation unit side body 2 and a set location of an image capturing command key corresponding to the attitude.

Next, a specific method for setting the image capturing command key by the setting unit 453 is explained with reference to FIGS. 5A to 5C and 6A to 6C. FIGS. 5A to 5C are views illustrating the attitude of the operation unit side body 2 and the set location of the image capturing command key corresponding to the attitude in a case of having the attitude of the operation unit side body 2 inclined to a direction substantially orthogonal to the reference direction D. FIG. 5A is a view illustrating a setting location of the image capturing command key in a case of the attitude of the operation unit side body 2 being in a direction substantially along the reference direction D.

Here, "the reference direction D" corresponds to a predetermined reference direction and refers to a direction which is the basis for the attitude of the operation unit side body 2 in which the camera 231 is disposed. More specifically, the reference direction D is a vertical direction, a horizontal direction, and the like. In addition, "an inclination angle of the operation unit side body 2" refers to an inclination angle of the operation unit side body 2 with respect to the reference direction D. For example, in a case of the reference direction D being the vertical direction, when a longitudinal direction of the operation unit side body 2 follows the vertical direction, the inclination angle thereof is 0 degrees.

As shown in FIG. 5A, in a case that an inclination angle $\theta 0$ is substantially 0 degrees when the operation unit side body 2 is seen from a face on which the operation unit 21 is provided, the setting unit 453 sets a select manipulation key 15 among predetermined keys in the operation unit 21 as the image capturing command key. That is to say, the setting unit 453 sets the select manipulation key 15 as the image capturing command key when the attitude of the operation unit side body 2 is in a direction substantially along the reference direction D. In addition, "an inclination angle $\theta 0$ is substantially 0 degrees" refers to a specific range including 0 degrees, and more specifically, for example, refers to the inclination angle $\theta 0$ with respect to the reference direction D falling in a the range of −10 degrees to 10 degrees.

FIG. 5B is a view illustrating a setting location of an image capturing command key in a case in which the cellular telephone device 1 of FIG. 5A is rotated in a clockwise fashion to have attitude of the operation unit side body 2 inclined in a direction substantially orthogonal to the reference direction D.

As shown in FIG. 5B, the setting unit 453 sets an input operation key (a first key) 14a among predetermined keys in the operation unit 21 as the image capturing command key when an inclination angle $\theta 1$ is substantially 90 degrees clockwise when the operation unit side body 2 is seen from a face on which the operation unit 21 is provided. In other words, the setting unit 453 switches the image capturing command key from the select operation key 15 to the input operation key 14a. In addition, "an inclination angle $\theta 1$ is substantially 90 degrees clockwise" refers to a specific range including 90 degrees, and more specifically, for example, refers to the inclination angle $\theta 1$ with respect to the reference direction D falling in a the range of 80 degrees to 100 degrees clockwise.

FIG. 5C is a view illustrating a setting location of the image capturing command key in a case in which the cellular telephone device 1 of FIG. 5A is rotated in an anti-clockwise fashion to have the attitude of the operation unit side body 2 inclined in a direction substantially orthogonal to the reference direction D.

As shown in FIG. 5C, the setting unit 453 sets an input operation key (a second key) 14b, which is different from the input manipulation key 14a, among predetermined keys in the operation unit 21, as the image capturing command key when an inclination angle $\theta 2$ is substantially 90 degrees anti-clockwise when the operation unit side body 2 is seen from a face on which the operation unit 21 is provided. In other words, the setting unit 453 switches the image capturing command key from the select operation key 15 to the input operation key 14b. In addition, "an inclination angle $\theta 2$ is substantially 90 degrees anti-clockwise" refers to a specific range including 90 degrees, and more specifically, for example, refers to the inclination angle $\theta 2$ in an image capturing direction D2 with respect to the reference direction D falling in a the range of 80 degrees to 100 degrees in the anti-clockwise direction.

As shown in FIGS. 5B and 5C, the input operation key 14a and the input operation key 14b that are set as the image capturing command key by the setting unit 453 are each located at a corner of the front face 20A of the operation unit side body 2.

In addition, in the operation unit side body 2, a key set as the image capturing command key is not provided on the lateral face 20c that intersects the front face 20A (see FIGS. 1 and 2).

Figure 6A:
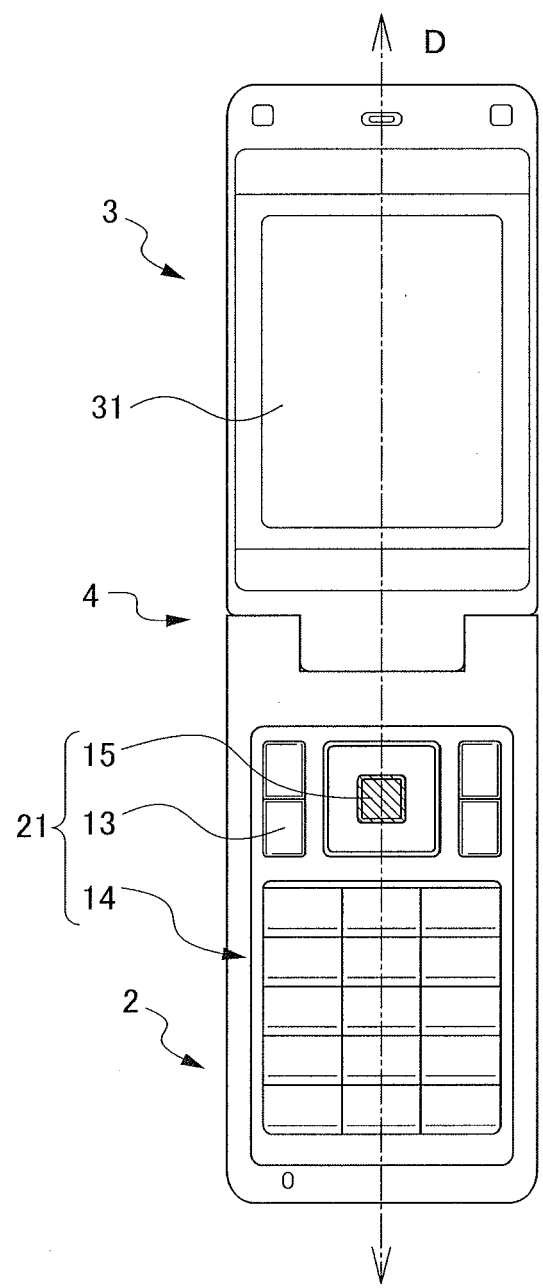
FIG. 6A is a view illustrating the attitude of the operation unit side body 2 and a set location of an image capturing command key corresponding to the attitude.
Figure 6B:
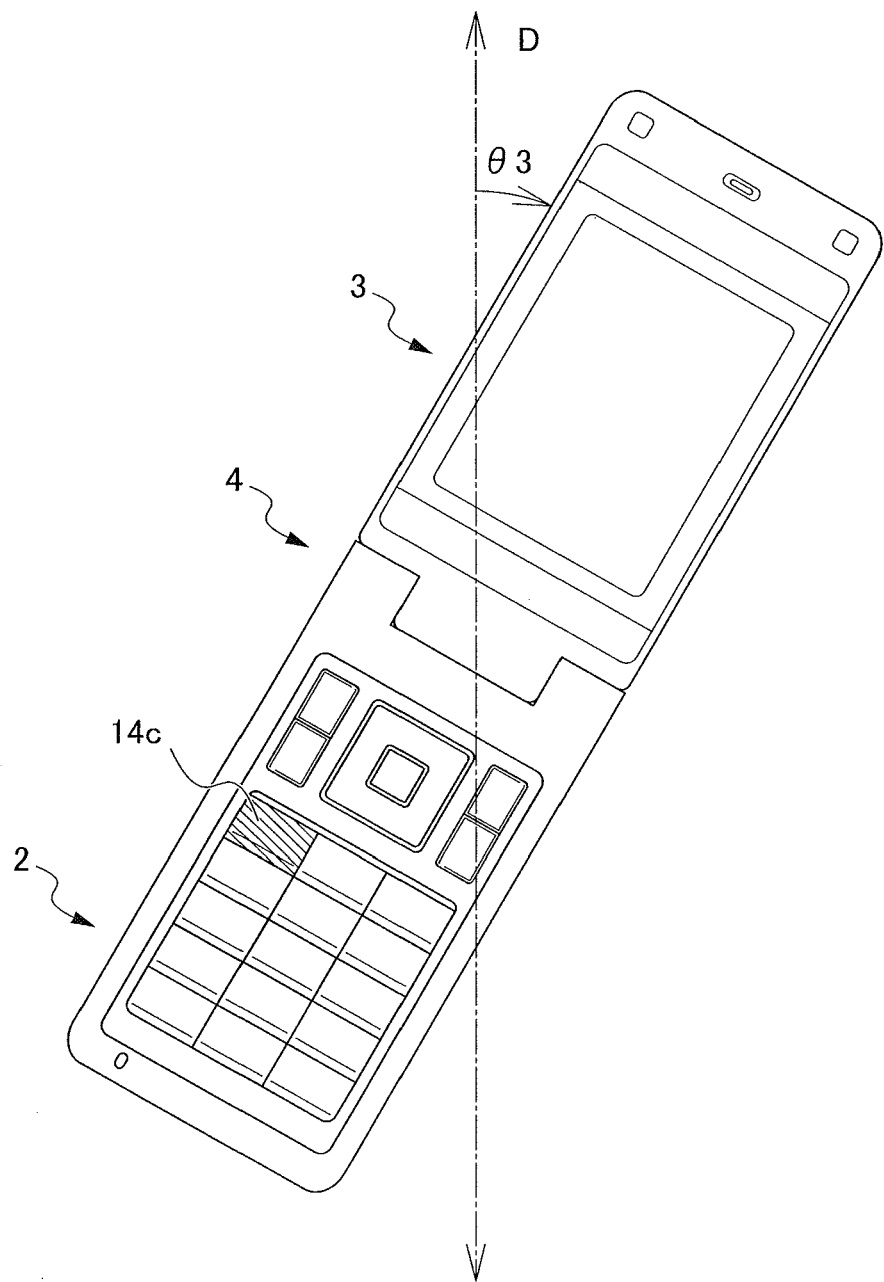
FIG. 6B is a view illustrating the attitude of the operation unit side body 2 and a set location of an image capturing command key corresponding to the attitude.
Figure 6C:
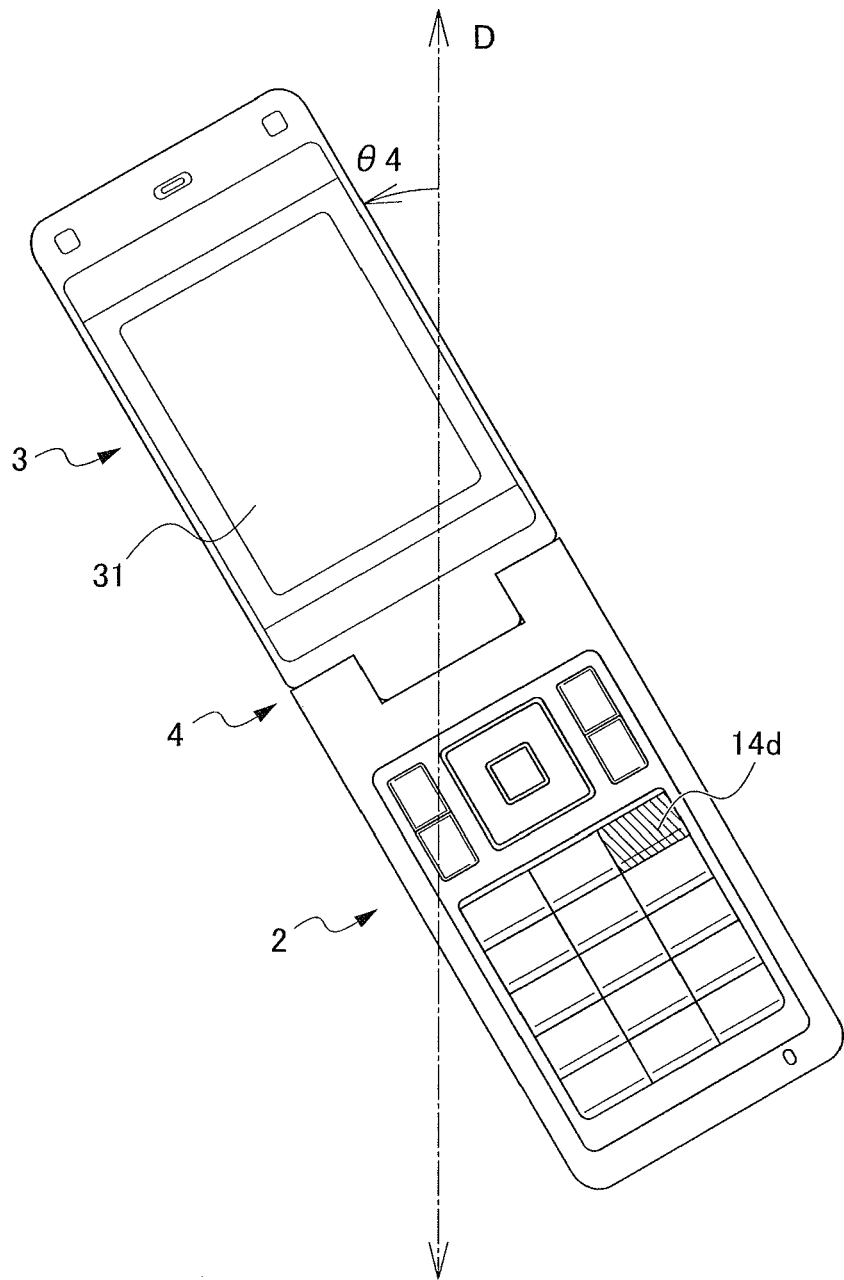
FIG. 6C is a view illustrating the attitude of the operation unit side body 2 and a set location of an image capturing command key corresponding to the attitude.

Next, a case of having the attitude of the operation unit side body 2 inclined in a direction sloped relative to the reference direction D is explained with reference to FIGS. 6A to 6C. FIGS. 6A to 6C are views illustrating attitudes of the operation unit side body 2 and a setting location of the image capturing command key in a case of having the attitude of the operation unit side body 2 inclined in a direction sloped relative to the reference direction D.

FIG. 6A, similarly to FIG. 5A described above, is a view illustrating a setting location of the image capturing command key in a case in which the attitude of the operation unit side body 2 substantially follows the reference direction D. As shown in FIG. 6A, in a case that an inclination angle θ0 is substantially 0 degrees when the operation unit side body 2 is seen from a face on which the operation unit 21 is provided, the setting unit 453 sets a select operation key 15 among predetermined keys in the operation unit 21 as the image capturing command key.

FIG. 6B is a view illustrating a setting location of an image capturing command key in a case in which the cellular telephone device 1 of FIG. 6A is rotated in a clockwise fashion to have attitude of the operation unit side body 2 inclined in a direction sloped relative to the reference direction D.

As shown in FIG. 6B, the setting unit 453 sets an input operation key (a third key) 14c among predetermined keys in the operation unit 21 as the image capturing command key when an inclination angle θ3 is substantially 45 degrees clockwise when the operation unit side body 2 is seen from a face on which the operation unit 21 is provided. In other words, the setting unit 453 switches the image capturing command key from the select operation key 15 to the input manipulation key 14c. In addition, "an inclination angle θ3 is substantially 45 degrees clockwise" refers to a specific range including 45 degrees, and more specifically, for example, refers to the inclination angle θ3 in an image capturing direction D2 with respect to the reference direction D falling in a the range of 35 degrees to 55 degrees in a clockwise direction.

FIG. 6C is a view illustrating a setting location of the image capturing command key in a case in which the cellular telephone device 1 of FIG. 6A is rotated anti-clockwise to have the attitude of the operation unit side body 2 inclined in a direction sloped relative to the reference direction D.

As shown in FIG. 6C, the setting unit 453 sets an input operation key (a fourth key) 14d, which is different from the input operation key 14c, among predetermined keys in the operation unit 21 as the image capturing command key when an inclination angle θ4 is substantially 45 degrees anti-clockwise when the operation unit side body 2 is seen from a face on which the operation unit 21 is provided. In other words, the setting unit 453 switches the image capturing command key from the select operation key 15 to the input operation key 14d. In addition, "an inclination angle θ4 is substantially 45 degrees anti-clockwise" refers to a specific range including 45 degrees, and more specifically, for example, refers to the inclination angle θ4 with respect to the reference direction D falling in the range of 35 degrees to 55 degrees in the anti-clockwise direction.

It should be noted that the ranges of the inclination angles θ1 to θ4 as mentioned above are merely examples and the invention of the present application is not limited thereto.

In addition, as shown in FIGS. 5A to 5C and 6A to 6C as mentioned above, the setting unit 453 sets a predetermined key as the image capturing command key at the operation unit 21 in a state in which the operation unit side body 2 and the display unit side body 3 are mutually opened (an opened state) when the camera 231 captures an image.

Next, the operation of the camera 231 according to the cellular telephone device 1 according to the first embodiment capturing an image is explained with reference to FIG. 7. FIG. 7 is a flowchart illustrating operations when performing image capturing using the camera 231 of the cellular telephone device 1 according to the first embodiment.

In Step S1, the control unit 45 activates the camera 231 in response a predetermined operation of the operation unit 21. A predetermined operation refers to pressing a camera activation key for activating the camera 231 in the operation unit 21.

In Step S2, the inclination angle detection unit 451 detects the inclination angle of the operation unit side body 2 with respect to the reference direction D.

In Step S3, the determination unit 452 determines the attitude of the operation unit side body 2 according to the inclination angle detected by the inclination angle detection unit 451.

In Step S4, the setting unit 453 sets a predetermined key in the operation unit 21 as the image capturing command key according to the attitude of the operation unit side body 2 which is determined by the determination unit 452.

In Step S5, the notification control unit 454 notifies the image capturing command key set by the setting unit 453 in a predetermined mode by way of the notification unit.

In Step S6, the control unit 45 determines whether the image capturing command key set in Step S4 has been pressed within a certain period. In a case of the image capturing command key having been pressed (Yes), the process advances to Step S7. On the other hand, in a case of the image capturing command key having not been pressed (No), the process advances to Step S2.

In Step S7, the camera 231 captures an image according to an image capturing command by way of the image capturing command key set in Step S4.

The following effects are exerted for example according to the cellular telephone device 1 of the first embodiment. The cellular telephone device 1 includes the operation unit side body 2, the operation unit 21 having a plurality of keys, the determination unit 452 that determines the attitude of the operation unit side body 2, the setting unit 453 that sets a predetermined key in the operation unit 21 as the image capturing command key for performing an image capturing command according to the attitude of the operation unit side body 2, which is determined by the determination unit 452, and the camera 231 that captures an image according to an image capturing command by way of the image capturing command key set by the setting unit 453.

In this way, the cellular telephone device 1 sets a predetermined key among a plurality of keys in the operation unit 21 as the image capturing command key by way of the setting unit 453 according to the attitude of the operation unit side body 2, which is determined by the determination unit 452. Therefore, with the cellular telephone device 1, since the image capturing command key is set at a location where a user can easily perform command for capturing an image according to the attitude of the operation unit side body 2, it is possible to ideally perform image capturing by the camera 231.

In addition, the cellular telephone device 1 further includes the inclination angle detection unit 451 that detects the inclination angle of the operation unit side body 2 with respect to the reference direction D, and the determination unit 452 determines the attitude of the operation unit side body 2 according to the inclination angle detected by the inclination angle detection unit 451. In this way, the cellular telephone device 1 can detect the attitude of the operation unit side body 2 precisely and set an image capturing command key according to the attitude thus detected since it sets the attitude of the operation unit side body 2 according to an inclination angle detected by the inclination angle detection unit 451. Therefore, the cellular telephone device 1 can ideally set the image capturing command key.

Here, in a case that an inclination angle is substantially 90 degrees clockwise or substantially 90 degrees anti-clockwise when the operation unit side body 2 is seen from a face on which the operation unit 21 is provided, it is often the case that the user captures an image using the camera 231 by holding four corners (an end portion opposite to the connection unit 4 of the operation unit side body 2 and an end portion opposite to the connection unit 4 of the display unit side body 3) of the cellular telephone device 1 (see FIGS. 5B and 5C).

According to the cellular telephone device 1 of the first embodiment, the setting unit 453 sets the input manipulation key 14a among predetermined keys in the operation unit 21 as the image capturing command key in a case that an inclination angle θ1 is substantially 90 degrees clockwise when the operation unit side body 2 is seen from a face on which the operation unit 21 is provided. Furthermore, in a case that an inclination angle θ2 is substantially 90 degrees anti-clockwise when the operation unit side body 2 is seen from a face on which the operation unit 21 is provided, the setting unit 453 sets the input manipulation key 14b, which is different from the input manipulation key 14a, among predetermined keys in the operation unit 21 as the image capturing command key.

In this way, for example, in a case of a user being left-handed, the image capturing command key is set to an input manipulation key 14a, and in a case of a user being a right-handed, the image capturing command key is set to an input manipulation key 14b. Therefore, regardless of a user's dominant hand, it is possible to set the image capturing command key to a location where the user can easily perform an image capturing command according to the attitude of the operation unit side body 2.

Furthermore, according to the cellular telephone device 1 of the first embodiment, each of the input operation key 14a and the input operation key 14b set by the setting unit 453 is located at a corner of the front face 20A of the operation unit side body 2. In this way, for example, when capturing an image by way of camera 231 by holding four corners of the cellular telephone device 1 (see FIGS. 5B and 5C), it is possible to set the image capturing command key to a location where the user can easily perform command for capturing an image according to the attitude of the operation unit side body 2, regardless of the user's dominant hand.

Furthermore, with the cellular telephone device 1 of the first embodiment, in the operation unit side body 2, a key set as the image capturing command key is not provided on a lateral face 20C that intersects the front face 20A. However, according to the cellular telephone device 1 of the first embodiment, it is possible to set the image capturing command key to a location where the user can easily perform an image capturing command according to the attitude of the operation unit side body 2, even if the thickness of the operation unit side body 2 and the display unit side body 3 is thin (for example, the total thickness of the operation unit side body 2 and the display unit side body 3 in an opened state is within 10 mm) and a side key as the image capturing command key cannot be provided on a lateral face of the operation unit side body 2 and the display unit side body 3.

Furthermore, according to the cellular telephone device 1 of the first embodiment, the setting unit 453 sets the input operation key 14c among predetermined keys in the operation unit 21 as the image capturing command key when an inclination angle θ3 is substantially 45 degrees clockwise when the operation unit side body 2 is seen from a face on which the operation unit 21 is provided. Furthermore, the setting unit 453 sets the input operation key 14d, which is different from the input operation key 14c, among predetermined keys in the operation unit 21 as the image capturing command key when an inclination angle θ4 is substantially 45 degrees anti-clockwise when the operation unit side body 2 is seen from a face on which the operation unit 21 is provided.

In this way, it is possible to set the image capturing command key to a location where the user can easily perform an image capturing command, even if the inclination of the operation unit side body 2 is in a direction sloped relative to the reference direction D.

Furthermore, according to the cellular telephone device 1 of the first embodiment, the setting unit 453 sets a predetermined key as the image capturing command key in the operation unit 21 in a state in which the operation unit side body 2 and the display unit side body 3 are mutually opened (an opened state). In this way, it is preferably possible for a user to capture an image by way of the camera 231 in an opened state in which the operation unit side body 2 is likely to be inclined.

Furthermore, according to the cellular telephone device 1 of the first embodiment, the control unit includes the notification unit that performs notification in a predetermined mode and the notification control unit 454 that notifies, in a case of a predetermined key being set as the image capturing command key by the setting unit 453, that this image capturing command key has been set, by way of the notification unit in a predetermined mode. Therefore, it is possible for the user to recognize the location of the image capturing command key based on the notification by the notification unit and to ideally perform image capturing using the camera 231.

Second Embodiment

Next, a second embodiment of a cellular telephone device 1 of the present invention is explained. It should be noted that, in the explanation of the second embodiment, the same reference numerals are assigned to the same constituent elements as the first embodiment and the explanations thereof are abbreviated or omitted. The cellular telephone device 1 of the second embodiment is different from that of the first embodiment in the points of the cellular telephone device 1 of the second embodiment using not include the acceleration sensor 46, not including the inclination angle detection unit 451, differing in the configuration of the determination unit 452, and including a selection display unit 455 and an attitude setting unit 456, while the other configurations of the second embodiment are similar the first embodiment.

The cellular telephone device 1 of the second embodiment has a function of selecting the attitude of the operation unit side body 2 when capturing an image using the camera 231.

Figure 8:
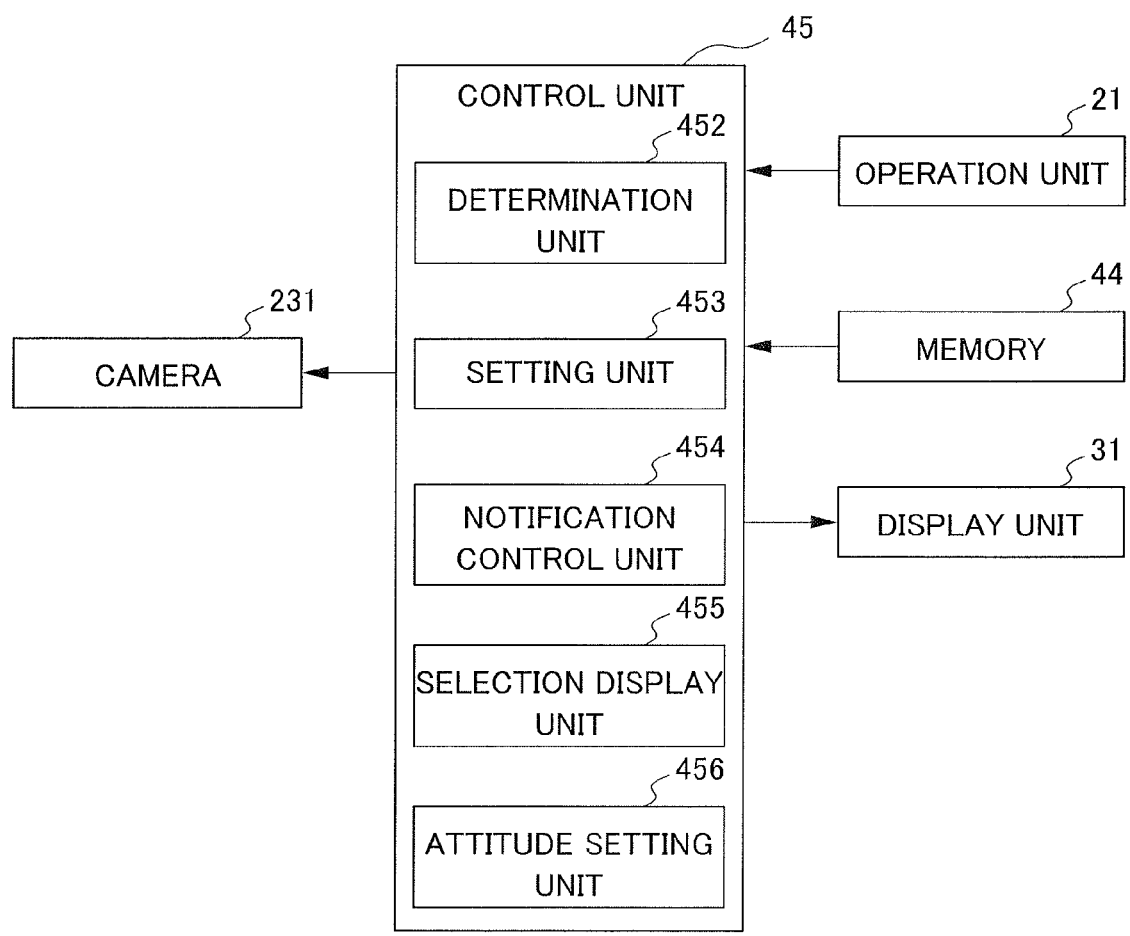
FIG. 8 is a block diagram illustrating functions of the cellular telephone device 1 according to a second embodiment.

In the following, configurations and operations for realizing the functions of the cellular telephone device 1 of the second embodiment are described in detail. First, the configuration for realizing functions of the cellular telephone device 1 according to the second embodiment is explained with reference to FIG. 8. FIG. 8 is a block diagram illustrating functions of the cellular telephone device 1 according to the second embodiment.

The control unit 45 includes the determination unit 452, the setting unit 453, the notification control unit 454, a selection display unit 455, and an attitude setting unit 456. It should be noted that, since the setting unit 453 and the notification control unit 454 have the same functions as in the first embodiment, explanations thereof are omitted.

The selection display unit 455 displays, on the display unit 31, a selection menu for selecting the direction of the operation unit side body 2 when capturing an image using the camera 231. The attitude setting unit 456 sets the attitude of the operation unit side body 2 in advance. More specifically, the attitude setting unit 456 sets the attitude corresponding to the direction of the operation unit side body 2 selected by the selection menu.

The determination unit 452 determines the attitude of the operation unit side body 2 when capturing an image using the camera 231 by selecting from the selection menu displayed on the display unit 31 by way of the selection display unit 455, according to the setting in the attitude setting unit 456.

Figure 9:
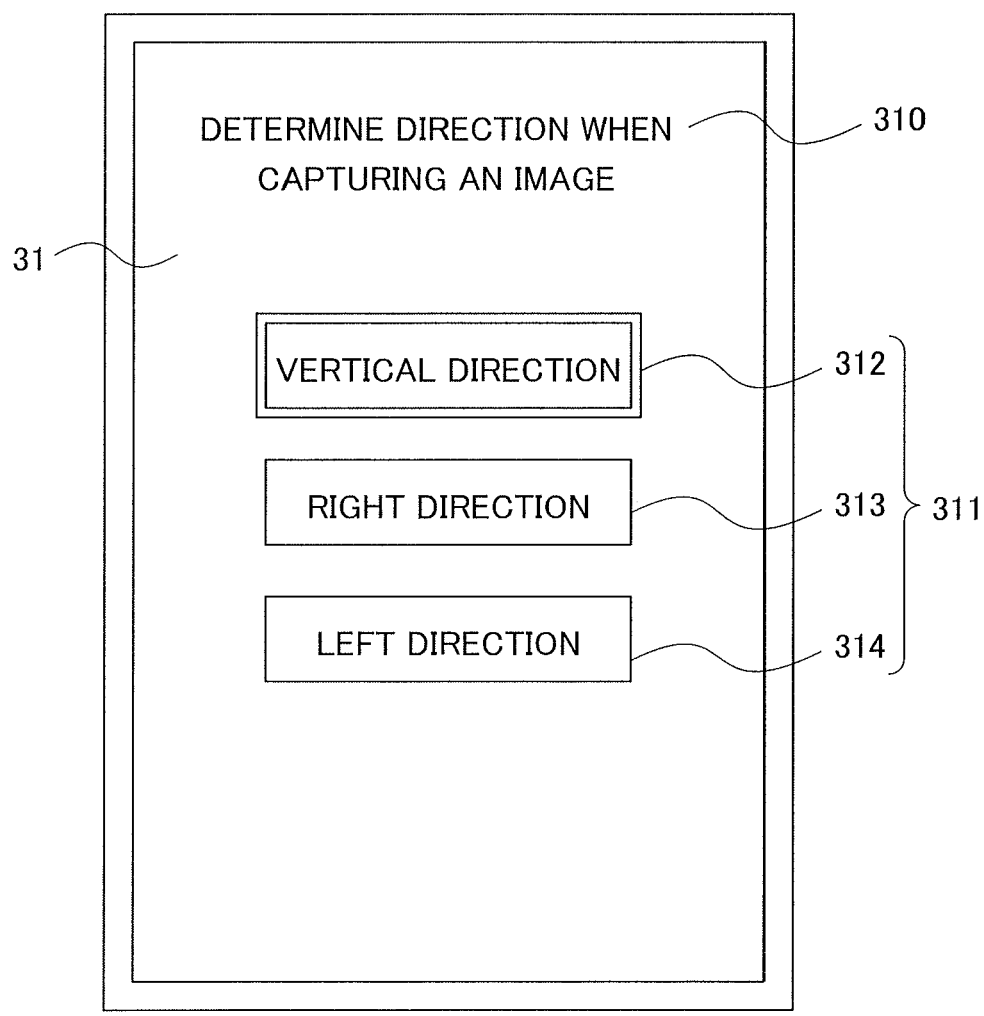
FIG. 9 is a view illustrating a specific example of a selection menu displayed on a display unit 31 by way of a selection display unit 455.

Here, the selection menu displayed on the display unit 31 by way of the selection display unit 455 is explained providing specific examples. FIG. 9 is a view illustrating a specific example of a selection menu displayed on a display unit 31 by way of the selection display unit 455. As shown in FIG. 9, the selection display unit 455 displays a message 310 and a selection menu 311 on the display unit 31 when the camera 231 is activated. The selection menu 311 constitutes menus 312 to 314.

More specifically, a message "select the direction when photographing" is displayed on the message 310 for allowing a user to pan attention to attitude of the operation unit side body 2 when capturing an image.

Furthermore, messages corresponding to the attitude of the operation unit side unit 2 are displayed on the menus 312 to 314, respectively. More specifically, the menu 312 displays "vertical direction", the menu 313 displays "right direction", and the menu 314 displays "left direction", respectively. Here, "vertical direction" corresponds to a case where the inclination angle θ0 is substantially 0 degrees when the operation unit side body 2 is seen from a face on which the operation unit 21 is provided (see FIG. 5A). Furthermore, "right direction" corresponds to a case where the inclination angle θ1 is substantially 90 degrees clockwise when the operation unit side body 2 is seen from a face on which the operation unit 21 is provided (see FIG. 5B). Furthermore, "left direction" corresponds to a case where an inclination angle θ2 is substantially 90 degrees anti-clockwise when the operation unit side body 2 is seen from a face on which the operation unit 21 is provided (see FIG. 5C).

The determination unit 452 determines the attitude of the operation unit side body 2 by selecting any one of the menus from the selection menus 311 by way of a selection manipulation at the operation unit 21.

Next, an operation when capturing an image using the camera 231 of the cellular telephone device 1 of the second embodiment is explained with reference to FIG. 10. FIG. 10 is a flowchart illustrating operations when capturing an image using the camera 231 of the cellular telephone device 1 of the second embodiment.

In Step S11, the control unit 45 activates the camera 231 according to a predetermined operation by way of the operation unit 21.

In Step S12, the selection display unit 455 displays the selection menu 311 (see FIG. 9) on the display unit 31 for selecting the attitude of the operation unit side body 2.

In Step S13, the determination unit 452 selects any one of the menus among the selection menus 311. Then, the determination unit 452 determines the attitude of the operation unit side body 2 according to the selection menu thus selected.

In Step S14, the setting unit 453 sets a predetermined key in the operation unit 21 as the image capturing command key according to the attitude of the operation unit side body 2 determined by the determination unit 452.

In Step S15, the notification control unit 454 notifies of the image capturing command key set by the setting unit 453, by way of the notification unit in a predetermined mode.

In Step S16, the camera 231 captures an image according to the image capturing command by way of the image capturing command key set in Step S14.

The following effects are exerted according to the cellular telephone device 1 of the second embodiment, for example. The determination unit 452 determines the attitude of the operation unit side body 2 by selecting the attitude of the operation unit side body 2 when capturing an image using the camera 231, according to the setting by the attitude setting unit 456. In this way, for example, even in a case that the cellular telephone device 1 does not include the acceleration sensor 46, it is possible to set the image capturing command key to a location where a user can easily perform an image capturing command according to the attitude of the operation unit side body 2 by determining the attitude of the operation unit side body 2 by way of the determination unit 452. Accordingly, the user can ideally perform image capturing using the camera 231.

In addition, the cellular telephone devices 1 of the abovementioned first and second embodiments are specifically effective in a case that thickness of the operation unit side body 2 and the display unit side body 3 is thin (for example, the total thickness of the operation unit side body 2 and the display unit side body 3 in a closed state is within 10 mm) and a side key as the image capturing command key cannot be provided on a lateral face of the operation unit side body 2 and the display unit side body 3.

Although embodiments of the present invention are described above, the present invention is not limited to the abovementioned embodiments and can be modified as appropriate.

For example, although the inclination angle detection unit 451 in the cellular telephone device 1 according to the first embodiment detects an inclination angle of the operation unit side body 2 based on an acceleration value outputted by the acceleration sensor 46 and based on an inclination angle of the operation unit side body 2 stored to be associated with the acceleration value in the memory 44, the present invention is not limited thereto. For example, the cellular telephone device 1 may detect an inclination angle of the operation unit side body 2 using an angle detection sensor. In addition, with the cellular telephone device 1 according to the first embodiment, although the reference direction D is in a longitudinal direction of the operation unit side body 2, the present invention is not limited thereto. For example, for the cellular telephone device 1, a predetermined direction of the operation unit side body 2 and the display unit side body 3 may be set as the reference direction D.

In addition, although the present invention is applied to the cellular telephone device 1 as a portable electronic device in the first and second embodiments, the present invention is not limited thereto. In other words, the present invention may be applied to another portable electronic device such as a PDA (personal digital assistant), laptop computer, digital camera, compact audio player, and the like.

EXPLANATION OF REFERENCE NUMERALS 1 cellular telephone device (portable electronic device)
21 operation unit
44 memory
45 control unit
46 acceleration sensor
231 camera (image capturing unit)
451 inclination angle detection unit
452 determination unit
453 setting unit
454 notification control unit
455 selection display unit

The invention claimed is:

1. A portable electronic device comprising:
a body;
an operation unit having a plurality of keys;
a determination unit that determines an attitude of the body;
a setting unit that sets predetermined keys among the plurality of keys in the operation unit as an image capturing command key for performing an image capturing command, according to the attitude of the body determined by the determination unit;
an image capturing unit that captures an image according to the image capturing command by way of the image capturing command key set by the setting unit; and
an inclination angle detection unit that detects an inclination angle of the body relative to a predetermined reference direction,
wherein the determination unit determines the attitude of the body according to the inclination angle detected by the inclination angle detection unit,
wherein the setting unit sets a first key among the predetermined keys as the image capturing command key when the inclination angle is substantially 90 degrees clockwise when the body is seen from a face on which the operation unit is provided, and sets a second key, which is different from the first key, among the predetermined keys as the image capturing command key when the inclination angle is substantially 90 degrees anti-clockwise when the body is seen from a face on which the operation unit is provided, and
wherein the plurality of keys is arranged on a face of the body in a rectangular shape with predetermined spacing, and the first key and the second key are located at corners of the face, respectively.

2. A portable electronic device comprising:
a body;
an operation unit having a plurality of keys;
a determination unit that determines an attitude of the body;
a setting unit that sets predetermined keys among the plurality of keys in the operation unit as an image capturing command key for performing an image capturing command, according to the attitude of the body determined by the determination unit;
an image capturing unit that captures an image according to the image capturing command by way of the image capturing command key set by the setting unit; and
an inclination angle detection unit that detects an inclination angle of the body relative to a predetermined reference direction,
wherein the determination unit determines the attitude of the body according to the inclination angle detected by the inclination angle detection unit,
wherein the setting unit sets a first key among the predetermined keys as the image capturing command key when the inclination angle is substantially 90 degrees clockwise when the body is seen from a face on which the operation unit is provided, and sets a second key, which is different from the first key, among the predetermined keys as the image capturing command key when the inclination angle is substantially 90 degrees anti-clockwise when the body is seen from a face on which the operation unit is provided,
wherein the plurality of keys is arranged on a face of the body in a rectangular shape with predetermined spacing, and the first key and the second key are located at corners of the face, respectively, and
wherein, in the body, a key that is set as the image capturing command key is not provided on a lateral face that intersects the face.

3. The portable electronic device according to claim 2, further comprising an attitude setting unit that sets the attitude of the body in advance,
wherein the determination unit determines the attitude of the body according to a setting of the attitude setting unit.

4. The portable electronic device according to claim 2, wherein the body includes:
a first body;
a second body; and
a connection unit that connects the first body and the second body to be openable and closable, and
wherein the setting unit sets the predetermined keys as the image capturing command key in a state in which the first body and the second body are mutually opened.

5. The portable electronic device according to claim 2, further comprising:
a notification unit that performs notification in a predetermined mode; and
a notification control unit that notifies of the image capturing command key being set by way of the notification unit in a predetermined mode, when the predetermined keys are set as the image capturing command key by the setting unit.

6. The portable electronic device according to claim 5, wherein the notification unit is a display unit, and
wherein the notification control unit displays a location of the image capturing command key on the display unit in the predetermined mode.

7. The portable electronic device according to claim 2, wherein the predetermined keys are input operation keys for inputting a character, numeral or symbol.

8. A portable electronic device comprising:
a body;
an operation unit having a plurality of keys;
a determination unit that determines an attitude of the body;
a setting unit that sets predetermined keys among the plurality of keys in the operation unit as an image capturing command key for performing an image capturing command, according to the attitude of the body determined by the determination unit;

an image capturing unit that captures an image according to the image capturing command by way of the image capturing command key set by the setting unit; and an inclination angle detection unit that detects an inclination angle of the body relative to a predetermined reference direction, wherein the determination unit determines the attitude of the body according to the inclination angle detected by the inclination angle detection unit, and wherein the setting unit sets a third key among the predetermined keys as the image capturing command key when the inclination angle is substantially 45 degrees clockwise when the body is seen from a face on which the operation unit is provided, and sets a fourth key, which is different from the third key, among the predetermined keys as the image capturing command key when the inclination angle is substantially 45 degrees anti-clockwise when the body is seen from a face on which the operation unit is provided.

9. A portable electronic device comprising:

a body;

an operation unit having a plurality of keys;

a determination unit that determines an attitude of the body;

a setting unit that sets predetermined keys among the plurality of keys in the operation unit as an image capturing command key for performing an image capturing command, according to the attitude of the body determined by the determination unit;

an image capturing unit that captures an image according to the image capturing command by way of the image capturing command key set by the setting unit;

an attitude setting unit that sets the attitude of the body in advance; and a display unit that displays a selection menu for selecting a direction of the body when capturing an image by the image capturing unit, wherein the determination unit determines the attitude of the body according to a setting of the attitude setting unit, and wherein the attitude setting unit sets attitude of the body according to the direction selected at the selection menu.

10. A portable electronic device comprising:

a body;

an operation unit having a plurality of keys;

a determination unit that determines an attitude of the body;

a setting unit that sets predetermined keys among the plurality of keys in the operation unit as an image capturing command key for performing an image capturing command, according to the attitude of the body determined by the determination unit;

an image capturing unit that captures an image according to the image capturing command by way of the image capturing command key set by the setting unit;

a notification unit that performs notification in a predetermined mode; and a notification control unit that notifies of the image capturing command key being set by way of the notification unit in a predetermined mode, when the predetermined keys are set as the image capturing command key by the setting unit, wherein the notification unit is a back light of the plurality of keys, and wherein the notification control unit turns on a back light of the predetermined keys set as the image capturing command key or changes a color of the back light of the predetermined key set as the image capturing command key as the predetermined mode.

11. A method for controlling a portable electronic device including a body and an operation unit having a plurality of keys, the method comprising:

determining an attitude of the body;

setting a different predetermined key among the plurality of keys in the operation unit to be an image capturing command key for performing an image capturing command-based on the attitude of the body determined in the determination step, thereby defining the different one of the plurality of keys capable of performing the image capturing command in response to the body being disposed in each of a plurality of attitudes; and capturing an image according to the image capturing command image by way of the image capturing command key set in the setting step;

detecting an inclination angle of the body relative to a predetermined reference direction;

determining the attitude of the body according to the detected inclination angle;

setting a first key among the predetermined keys as the image capturing command key when the inclination angle is substantially 90 degrees clockwise when the body is seen from a face on which the operation unit is provided; setting a second key, which is different from the first key, among the predetermined keys as the image capturing command key when the inclination angle is substantially 90 degrees anti-clockwise when the body is seen from a face on which the operation unit is provided;

wherein the plurality of keys is arranged on a face of the body in a rectangular shape with predetermined spacing, and the first key and the second key are located at corners of the face, respectively.

* * * * *